United States Patent
Eggenhaus

[19]

[11] Patent Number: 5,937,621

[45] Date of Patent: Aug. 17, 1999

[54] HARVESTER WITH HEIGHT ADJUSTABLE PROCESSING ATTACHMENT

[75] Inventor: Georg Eggenhaus, Ostbevern, Germany

[73] Assignee: Claas KGaA, Harsewinkel, Germany

[21] Appl. No.: 08/877,005

[22] Filed: Jun. 16, 1997

[30] Foreign Application Priority Data

Jun. 14, 1996 [DE] Germany ............................ 196 23 754

[51] Int. Cl.[6] .................................................. A01D 34/28
[52] U.S. Cl. ..................................... 56/10.2 E; 56/10.2 R
[58] Field of Search ........................... 56/10.2 R, 10.2 A,
56/10.2 E, 10.2 F, 10.4, 208, DIG. 15;
364/424.07

[56] References Cited

U.S. PATENT DOCUMENTS

| | | | |
|---|---|---|---|
| 4,942,724 | 7/1990 | Diekhans et al. | 56/10.4 |
| 5,299,413 | 4/1994 | Gale | 56/10.2 E |
| 5,309,700 | 5/1994 | Winkel et al. | 56/10.2 E |
| 5,359,836 | 11/1994 | Zeuner et al. | 56/10.2 E |
| 5,415,586 | 5/1995 | Hanson et al. | 56/10.2 E X |
| 5,463,854 | 11/1995 | Chmielewski, Jr. et al. | 56/10.2 E |

FOREIGN PATENT DOCUMENTS

WO 95/23496   9/1995   WIPO .

*Primary Examiner*—Terry Lee Melius
*Assistant Examiner*—Robert Pezzuto
*Attorney, Agent, or Firm*—Michael J. Striker

[57] ABSTRACT

An agricultural machine has a processing attachment, an adjusting device operative for height-adjustment of a working position of the processing attachment relative to the ground, and an additional adjusting device operative for adjusting at least one further working parameter of the processing attachment, in addition to the working position, the additional adjusting device having means for storing nominal values for the working parameter of the processing device corresponding to different working positions, and means for supplying a working position signal to the additional device to select a corresponding one of the nominal values for the additional working parameter so that the additional working parameter is automatically adjustable by the additional adjusting device to a nominal value corresponding to the working position signal.

34 Claims, 4 Drawing Sheets

| | HARVESTING CONDITIONS | WORKING POSITION/ CUTTING HEIGHT | REAPER ROTARY SPEED | REAPER HEIGHT | REAPER HORIZONTAL POSITION |
|---|---|---|---|---|---|
| 1 | LAID GRAIN | ALS1 | P1 - SW1 | P2 - SW1 | P3 - SW1 |
| 2 | STANDING POSITION | ALS2 | P1 - SW2 | P2 - SW2 | P3 - SW2 |
| 3 | MOVING | ALS3 | P1 - SW3 | P2 - SW3 | P3 - SW3 |
| 4 | ROLLING | ALS4 | P1 - SW4 | P2 - SW4 | P3 - SW4 |

FIG.3

HARVESTER WITH HEIGHT ADJUSTABLE PROCESSING ATTACHMENT

BACKGROUND OF THE INVENTION

The present invention relates to a harvester with a processing attachment which is height adjustable relative to the ground by an adjusting device in its working position.

More particularly, it relates to a harvesting machine with a processing attachment which, in addition to the working position, has at least one additional working parameter adjustable by a corresponding adjusting device.

The patent document WO95/23496 discloses a device for regulating a ground distance of the processing attachment of a harvester, for example, a harvester thresher with a height adjustable cutting mechanism. For regulating the ground distance, both the position of the processing attachment relative to the harvester as well as the distance of the processing attachment to the ground is measured, and both measuring signals are evaluated individually or in combination for the regulation process. Such an arrangement in a harvester thresher provides a uniform cutting of grain in a predetermined stubble height (cutting height) even in condition of uneven ground. For providing a good harvesting yield, the cutting height (working position) is correspondingly adjusted to the harvesting conditions (for example laid grain, mowing drive/turning drive). In addition to the cutting height of the cutting mechanism, also other working parameters of the cutting mechanism are important for an optimal harvesting result, in particular the adjustment of the reaper which is rotatably supported on the cutting mechanism, is driven by a motor and contributes to the pickup of the harvested product. The working parameters of the reaper arranged on the cutting mechanism include a reaper rotary speed with a predetermined lead or a synchronization relative to the traveling speed of the harvester to be adjusted, the height of the reaper relative to the cutting mechanism or a vertical reaper adjustment, and the horizontal position of the reaper relative to the cutting mechanism.

These working parameters are adjustable by an operator of the harvester manually, for example by a corresponding switch or key, to provide an optimal pickup of the harvested product in the cutting mechanism. With a change of the predetermined cutting height by the operator, for example during a change of the harvested conditions within one stroke, the operator for obtaining an optimal harvesting results is forced to manually adjust the working parameter of the reaper in correspondence with the newly selected cutting height. This requires a lot of attention and a high concentration of the operator, since it is necessary to react very fast to the changing conditions. This is especially difficult when, with a reaper, three independent working parameters must be adjustable. After several working hours and during night shift such adjustments are difficult for the operator, and faulty adjustments can make worse the harvesting and also to damage the cutting mechanism.

SUMMARY OF THE INVENTION

Accordingly, it is an object of the present invention to provide a harvester of the above mentioned general type, which avoids the disadvantages of the prior art.

More particularly, it is an object of the present invention to provide a harvester with a processing attachment which is height adjustable relative to the ground, in which the height adjustment of at least one further adjustable working parameter is improved, and during a change of the working position relative to the ground the operator is completely unloaded from adjustment steps of other working parameters.

In keeping with these objects and with others which will become apparent hereinafter, one feature of present invention resides, briefly stated, in a harvester in which the corresponding adjustment device for the working parameter includes means for storing nominal values corresponding to different working positions for a working parameter of a processing attachment, in correspondence with a working signal supplied to the adjusting device a predetermined nominal value for the working parameter is selected, and the working parameter is automatically adjustable by the adjusting device to the nominal value corresponding to the working position signal.

The harvester in accordance with the present invention has the advantage that the adjustable working parameters of the processing attachment are automatically adjustable in correspondence with the respective working position (working height over the ground) to preselected, optimal values.

This means that the operator of the harvester is substantially unloaded, so that he can more efficiently concentrate on the control of other processes in the harvester. Fatigue and concentration loss due to high stress as well as unreliable adjustment due to poor visibility during a night work are thereby counter acted.

Moreover there is a further advantage in that, independently from the corresponding operator, an optimal working position-depending adjustment of the other working parameters can be guaranteed. For example, a working parameter which is manually adjusted by an experienced person during one harvesting travel can be stored for predetermined working positions as nominal values for an automatic working position dependent adjustment. These values can be later used by the operator. Also, other not so experienced operators can use these values.

In addition to storing of the optimal "learned" nominal values during the harvesting travel, also predetermined, individual, several or all nominal values can be inputted through an input medium (key board) for example by pressing a key as new actual values. For information of the operator, the nominal values can be indicated on a display in a driver's cabin.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a correlation table for nominal values stored in a microprocessor of an adjusting device for a working parameter.

DESCRIPTION OF PREFERRED EMBODIMENTS

Figure 1:
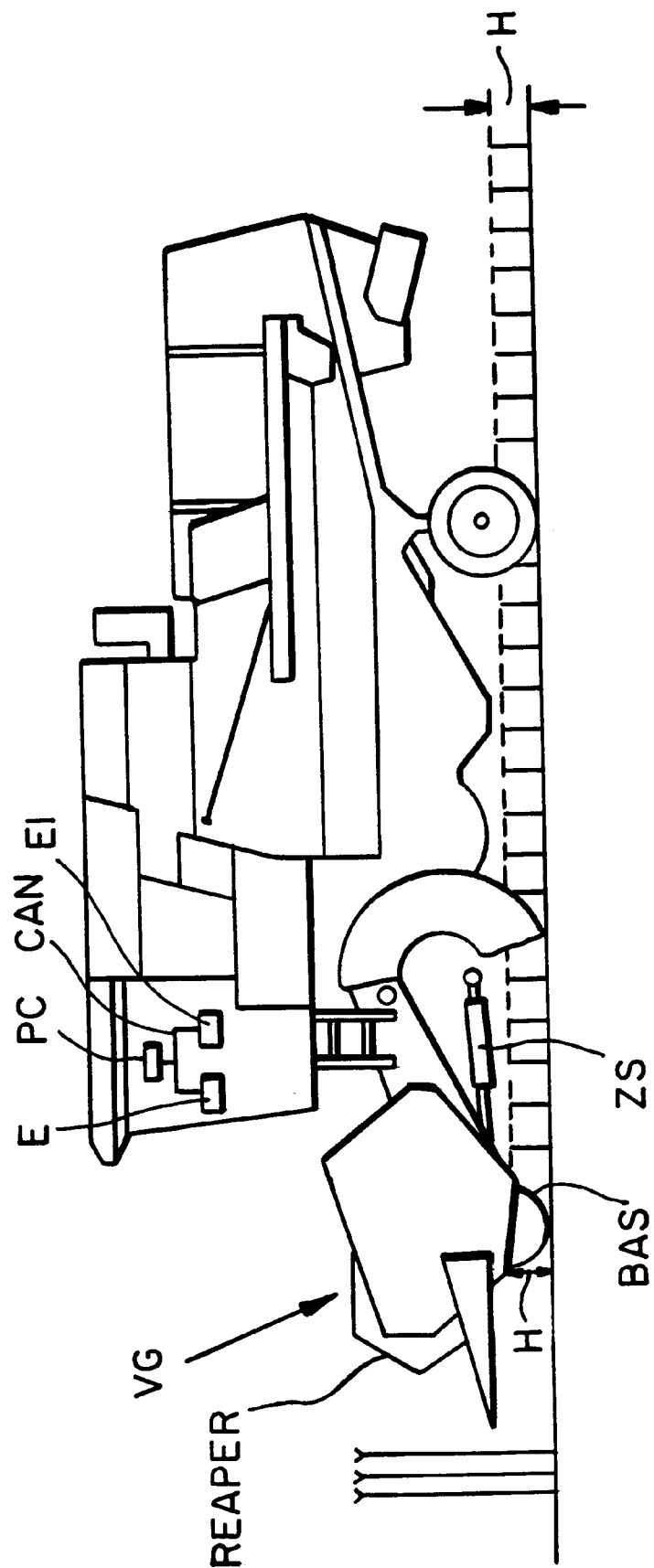
FIG. 1 is a side view of a harvester thresher in accordance with the present invention.

A harvester thresher shown in FIG. 1 has a processing attachment formed as a cutting mechanism (VG) which is height-adjustable relative to the ground. For providing the height adjustability, the cutting mechanism (VG) is adjustable by a hydraulically actuated control cylinder-piston unit (ZS) in its position relative to the harvester thresher, around a rotary axis. A regulating valve for supplying the control cylindrical piston-unit (ZS) with a hydraulic unit is controlled from a driver's cabin by an electric adjusting device (E). The working position (H) of the cutting mechanism (VG) corresponds to the cutting height/stubble height. For determination of the ground distance, at least one sensing bracket formed as a ground distance sensor (BAS) is arranged on the cutting mechanism (BG). Instead of a sensing bracket, also an ultrasound sensor or a laser sensor or a combination of these sensors can operate as the ground distance sensor (BAS).

A reaper is a component of the cutting mechanism which is the processing attachment. The reaper is rotatably supported, motor-driven and contributes to the pickup of the harvested product. With the reaper, the cutting mechanism in addition to the working position/cutting heights, has three further working parameters which are adjustable from the driver's cabin through electronic adjusting devices (E1, E2, E3). These adjustable working parameters are the reaper rotary speed, the height of the reaper relative to the cutting mechanism, and the horizontal position of the reaper relative to the cutting mechanism. FIG. 1 symbolically shows only one adjusting device (E1) for one working parameter. The adjusting devices (E, E1 . . . ) Are connected with the central control computer (PC) preferably through a communication network (Bussystem, CAN Control Area Network).

Figure 2:
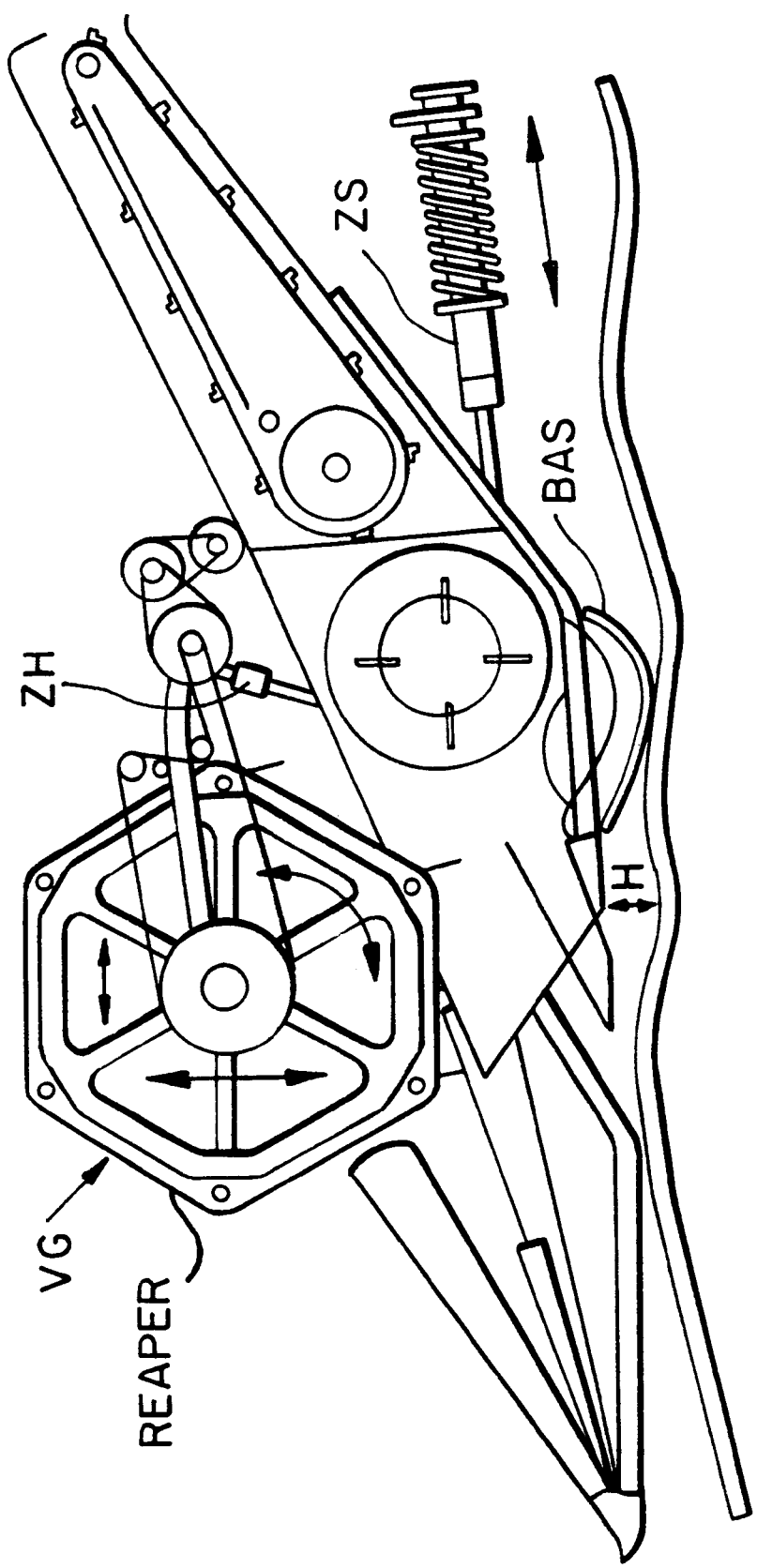
FIG. 2 is a view showing details of a cutting mechanism of the inventive harvester thresher.

FIG. 2 shows in detail the cutting mechanism (VG) for the reaper. It clearly illustrates the hydraulic control cylinder-piston unit (ZH) for the height adjustment of the reaper relative to the cutting mechanism (VG) as well as the drive for the rotary movement of the reaper (reaper rotary speed). The hydraulic control cylinder for the adjustment of the horizontal position of the reaper is not shown in the drawing.

The corresponding adjusting device (E1, E2, E3) has a microprocessor ($\mu$P) as means for storing nominal values as (SW) which is optimally correspond to the predetermined working positions (H). A correlation table shown in FIG. 3 is storable in the micro processor ($\mu$P). Two or more adjusting devices can have also access to a joint microprocessor.

FIG. 3 shows a correlation table for working positions/cutting heights which correspond to four different harvesting conditions. The arrangements can be different from one stroke to another (from one cut to another), and from one grain sort to another grain sort. The four working positions are indicated to the adjusting devices (E1, E2, E3) through working position signals (ILS1, ILS2, ILS3, ILS4). The different nominal values are identified with (P1–SW$_j$(i=1, 2, 3 and j=1, 2, 3, 4).

In the following text, for the four harvesting conditions for example tendencially as well considered coordinated values for the reaper rotary speed and the reaper height are provided. During a harvesting travel in the laid grain with a cutting height (ALS1) of 80 mm, a reaper rotary speed (P1–SW1) which makes possible an increased lead of the reaper relative to the traveling speed, as well as a low reaper height are favorable. In a standing condition with the cutting height (ALS2) of 120 mm, a lower reaper lead and a reaper height corresponding to the spike tips are favorable. During mowing with a cutting height (ALS3) of 200 mm a reaper synchronization and a reaper height corresponding to the spike tips are favorable. During turning with a cutting height (ALS4) of 600 mm a lower reaper lead and a lower reaper height are favorable.

The storage of the nominal values (PI–SW$_j$) can be performed on the one hand so that a working parameter for a predetermined working position (ALSi) which is manually optimally adjusted during the harvesting travel is manually intermedially stored and is stored as a nominal value (PI–SWJ). On the other hand,. It is also provided that the nominal value (PI–SWJ) of the working parameter for a predetermined working position (ALSi) can be manually predetermined and inputted.

In accordance with one embodiment, nominal values (SW) for the working parameter are stored only for predetermined working positions (discrete nominal value distribution) within the height-adjustable working position region of the processing attachment (VG). In accordance with an alternative embodiment, the height-adjustable working position region of the processing attachment (VG) is subdivided into intervals, and a nominal value (SW) for the corresponding working parameter corresponds to each interval. In accordance with a further embodiment, the nominal values (SW) for the corresponding working parameter are continuously distributed over the total height-adjustable working position region of the processing attachment.

Figure 4:
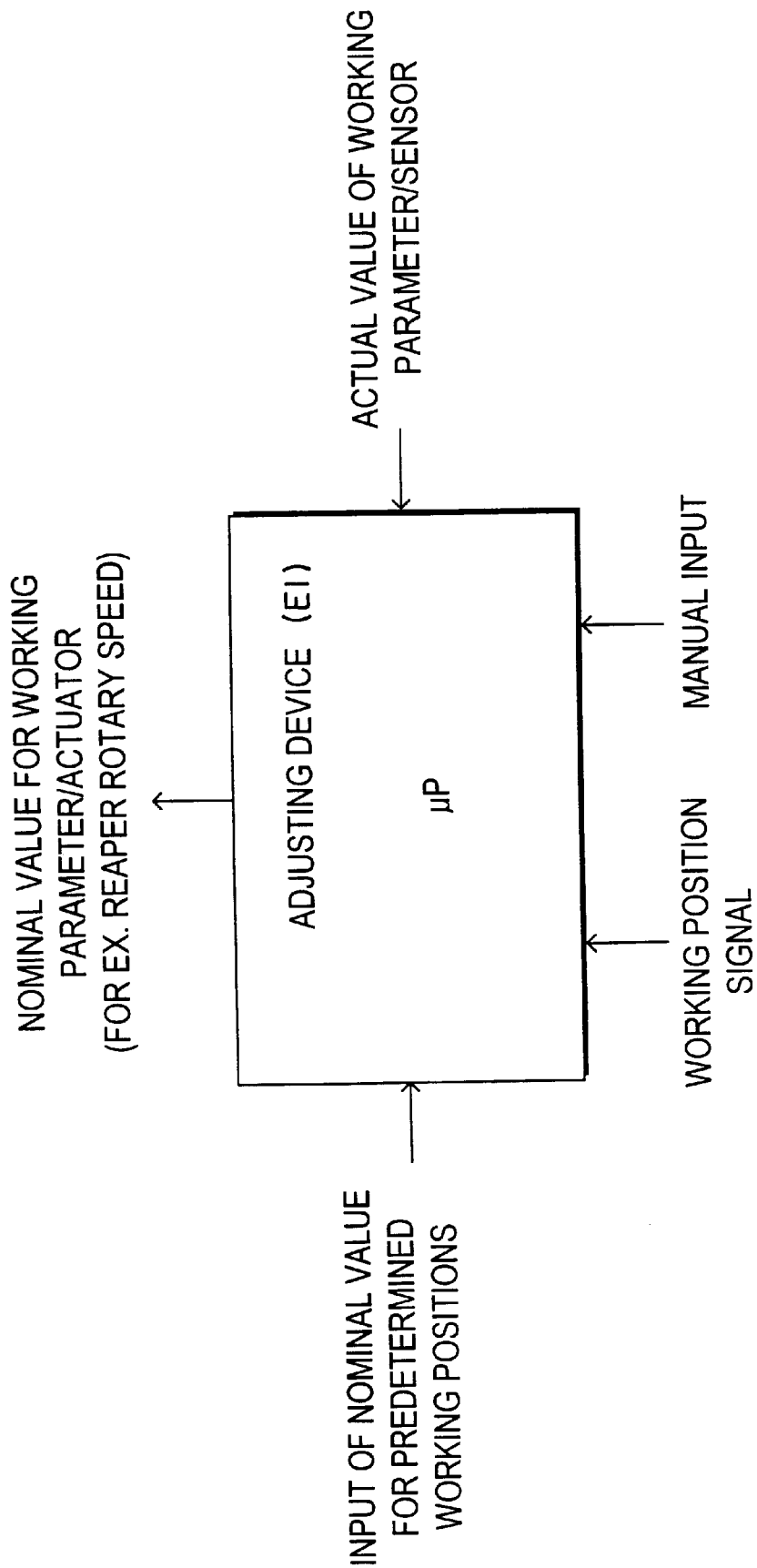
FIG. 4 is a view showing input and output signals of the electrical adjusting device for a working parameter.

The electronic adjusting device (E1) shown in FIG. 4 receives a working position signal (ALS) for selection of the nominal value (SW) corresponding to the respective working position. The working position signal (ALS) can correspond to the nominal value adjusted on the adjusting device (E) for the working position (H), which is adjusted for example by pressing a predetermined key in the driver's cabin. Alternatively, the working position signal (ALS) can be produced by a ground distance sensor (BAS) arranged on the cutting mechanism (VG). Furthermore, it is provided that the working position signal (ALS) is produced by a position sensor arranged on the harvester and sensing the position of the processing attachment relative to the harvester. Also, a combination of the ground distance sensor (BAS) and the position sensor is possible for producing the working position signal (ALS).

In the case of a manual operation (oversteering) of the adjusting device (E1) for a working parameter, the automatic working position-dependent adjustment is automatically turned off. The working position-depending adjustment is again activated by an automatic key arranged in the driver's cabin.

A further working parameter adjustable in dependence on the cutting height is produced in the mechanism (VG) with a variably adjustable length of the cutting trough.

The automatic working position/cutting height-dependent adjustment not necessarily must include all possible adjustable working parameters. Instead, it can be limited to one or more predetermined parameters.

The invention is not limited to a harvester with cutting mechanism as the processing attachment. It can be used also in harvesters with a corn picking attachment in an advantageous manner. The peripheral speed of the chain arranged on the picking plates and provided with picking fingers, as well as the picking plate distance can be adjusted in accordance with the present invention as to the working height of the corn picking attachment. Also, in a field chopper with a corn teeth attachment the invention can be utilized as well, and the peripheral speed of the pulling-in chain can be adjusted in accordance with the present invention in dependence on the working height of the corn teeth attachment. Also, the invention can be used in a field chopper with a pickup which is adjustable in its working position relative to the ground and cuts harvested product from swaths, so that the peripheral speed of the receiving prongs can be automatically adjustable in dependence on the position.

It will be understood that each of the elements described above, or two or more together, may also find a useful application in other types of constructions differing from the types described above.

While the invention has been illustrated and described as embodied in a harvester with height adjustable processing attachment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An agricultural machine, comprising a processing attachment; an adjusting device operative for height-adjustment of a working position of said processing attachment relative to the ground; and an additional adjusting device operative for adjusting at least one additional working parameter of said processing attachment, in addition to said working position, said additional adjusting device having means for storing nominal values for the working parameter of said processing attachment corresponding to different working positions; and means for supplying a working position signal to said additional device to select a corresponding one of the nominal values for the additional working parameter so that the additional working parameter is automatically adjustable by said additional adjusting device to a nominal value corresponding to the working position signal.

2. An agricultural machine as defined in claim 1; and further comprising means for manually intermediately storing an additional working parameter adjusted during a machine travel for a predetermined working position, and storing the adjusted working parameter as a nominal value for an automatic, working position-dependent adjustment.

3. An agricultural machine as defined in claim 1; and further comprising means for manually providing and storing the nominal values for the additional working parameters for different working positions of said processing attachment.

4. An agricultural machine as defined in claim 2; and further comprising means for manually operating said additional adjusting device so as to automatically turn off the working position-dependent adjustment.

5. An agricultural machine as defined in claim 1; and further comprising means for storing the nominal values for the additional working parameters for predetermined working positions within a height-adjustable working position region of said processing attachment.

6. An agricultural machine as defined in claim 1; and further comprising means for subdividing a height-adjustable working position region of said processing attachment into intervals so as to provide a correspondence of a nominal value for the additional working parameter to each of the intervals.

7. An agricultural machine as defined in claim 1; and further comprising means for distributing the nominal values for the additional working parameters continuously over a total height-adjustable working position region of said processing attachment.

8. An agricultural machine as defined in claim 1, wherein said additional adjusting device has a microprocessor with an integrated memory for the nominal values.

9. An agricultural machine as defined in claim 1; and further comprising a joint microprocessor for a plurality of said adjusting devices for adjusting of different working parameters.

10. An agricultural machine as defined in claim 1; and further comprising a central control computer; and a communication network through which said additional adjusting device is connected with said central computer.

11. An agricultural machine as defined in claim 1, wherein said additional adjusting device is formed so that the working position signal supplied to said additional adjusting device corresponds to a nominal value adjusted by said first-mentioned adjusting device for the additional working position.

12. An agricultural machine as defined in claim 1; and further comprising a ground distance sensor arranged on said processing attachment and measuring a working height over the ground to produce the working signal supplied to said additional adjusting device for the corresponding additional working parameter.

13. An agricultural machine as defined in claim 12, wherein said ground distance sensor includes at least one sensor for each side of said processing attachment.

14. An agricultural machine as defined in claim 12, wherein said ground distance sensor includes at least one ultrasound sensor.

15. An agricultural machine as defined in claim 12, wherein said ground distance sensor includes at least one laser beam sensor.

16. An agricultural machine as defined in claim 1; and further comprising a position sensor which senses a position of said processing attachment relative to the machine and produces the working signal supplied to said additional adjusting device for the additional working parameter.

17. An agricultural machine as defined in claim 1; and further comprising a ground distance sensor which jointly produce the working position signal supplied to said additional adjusting device for the additional working parameter.

18. An agricultural machine as defined in claim 1, wherein said processing attachment is a cutting mechanism of a harvester thresher which is height-adjustable in its working position relative to the ground and is provided with a reaper, said additional adjusting device being operative for adjusting a height of said reaper relative to said cutting mechanism automatically in dependence on a working position.

19. An agricultural machine as defined in claim 1, wherein said processing attachment is a cutting mechanism of a harvester thresher which is height-adjustable in its working position relative to the ground and provided with a reaper, said additional adjusting device being operative for adjusting a rotary speed of said reaper automatically in dependence on the working position.

20. An agricultural machine as defined in claim 19, wherein said additional adjusting device being operative for automatically adjusting the rotary speed of said reaper in dependence on a cutting height.

21. An agricultural machine as defined in claim 1, wherein said processing attachment is a cutting mechanism of a harvester thresher which is height adjustable in its working position relative to the ground and provided with a reaper, said additional adjusting device is operative for adjusting a horizontal position of said reaper relative to said cutting mechanism automatically in dependence on the working position.

22. An agricultural machine as defined in claim 21, wherein said additional adjusting device is operative for adjusting the horizontal position of said reaper relative to said cutting mechanism in dependence on a cutting height.

23. An agricultural machine as defined in claim 1, wherein said processing attachment is a cutting mechanism of a harvester which is height-adjustable in its working position relative to the ground and has a cutting trough, said additional adjusting device being operative for adjusting said cutting trough of said cutting mechanism automatically in dependence on the working position.

24. An agricultural machine as defined in claim 23, wherein said additional adjusting device is operative for adjusting a cutting height of said cutting trough of said cutting mechanism.

25. An agricultural machine as defined in claim 24, wherein said additional adjusting device is operative for adjusting the length of the cutting trough of said cutting mechanism in dependence on a cutting height.

26. An agricultural machine as defined in claim 1, wherein said processing attachment is a corn picking attachment of a harvester which is height-adjustable in its working position relative to the ground and has a plurality of picking plates with picking fingers arranged on rotatable chains, said additional adjusting device being operative for adjusting a speed of picking of said chains automatically in dependence on the working position.

27. An agricultural machine as defined in claim 26, wherein said additional adjusting device is operative for adjusting the picking speed of said chains automatically in dependence on a cutting height.

28. An agricultural machine as defined in claim 1, wherein said processing attachment is a corn picking attachment which is height adjustable in said working position relative to the ground and provided with a plurality of picking plates and a picking fingers arranged on rotatable chains, said additional adjusting device being operative for adjusting a picking plate distance automatically in dependence on the working position.

29. An agricultural machine as defined in claim 28, wherein said adjusting device is operative for adjusting the picking plate distance in dependence on a cutting height.

30. An agricultural machine as defined in claim 1, wherein said processing attachment is a corn teeth attachment which is height adjustable in its working position relative to the ground and provided with rotatable pulling-in chains, said additional adjusting device being operative for adjusting a rotary speed of said pulling in chains automatically in dependence on a working position.

31. An agricultural machine as defined in claim 1, wherein said processing attachment is a pickup of a field chopper which is height adjustable over the bottom and cuts a harvested product from swats, said additional adjusting device being operative for adjusting a position of a holder arranged on the pickup automatically in dependence on the working position.

32. An agricultural machine as defined in claim 31, wherein said additional adjusting device is operative for adjusting the position of the holder in dependence on a cutting height.

33. An agricultural machine as defined in claim 32, wherein said processing attachment is a pickup of a field chopper which is height-adjustable in its working position over the ground and cuts harvested product from swath, said additional adjusting device being operative for adjusting a rotary speed of pickup prongs of said pickup automatically in dependence on the working position.

34. An agricultural machine as defined in claim 33, wherein said additional adjusting device is operative for adjusting the rotary speed of the picking up prongs in dependence on a cutting height.

* * * * *